United States Patent
Acharya

(10) Patent No.: US 7,110,359 B1
(45) Date of Patent: Sep. 19, 2006

(54) SYSTEM AND METHOD FOR DYNAMICALLY UPDATING WEIGHTS OF WEIGHTED ROUND ROBIN IN OUTPUT QUEUES

(75) Inventor: Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 928 days.

(21) Appl. No.: 09/797,692

(22) Filed: Mar. 5, 2001

(51) Int. Cl.
*H04L 12/26* (2006.01)
*H04L 12/54* (2006.01)
*G06F 15/173* (2006.01)

(52) U.S. Cl. ............... 370/235; 370/395.41; 370/413; 370/429; 709/240; 710/29

(58) Field of Classification Search ............... 370/230, 370/231, 235.1, 235, 252, 395.4, 395.41, 370/395.42, 411, 412, 413, 415, 416, 417, 370/418, 419, 395.1, 429; 709/240; 710/29
See application file for complete search history.

(56) References Cited

U.S. PATENT DOCUMENTS

| | | | | |
|---|---|---|---|---|
| 5,793,748 A | * | 8/1998 | Murase | 370/235 |
| 6,067,301 A | * | 5/2000 | Aatresh | 370/418 |
| 6,229,795 B1 | * | 5/2001 | Pankaj et al. | 370/329 |
| 6,408,005 B1 | * | 6/2002 | Fan et al. | 370/412 |
| 6,438,135 B1 | * | 8/2002 | Tzeng | 370/412 |
| 6,452,933 B1 | * | 9/2002 | Duffield et al. | 370/415 |
| 6,470,016 B1 | * | 10/2002 | Kalkunte et al. | 370/395.41 |
| 6,480,911 B1 | * | 11/2002 | Lu | 710/54 |
| 6,611,522 B1 | * | 8/2003 | Zheng et al. | 370/395.21 |
| 6,618,378 B1 | * | 9/2003 | Giroux et al. | 370/395.1 |
| 6,732,209 B1 | * | 5/2004 | Cherukuri et al. | 710/240 |
| 6,754,179 B1 | * | 6/2004 | Lin | 370/235 |
| 6,829,678 B1 | * | 12/2004 | Sawdon et al. | 711/114 |
| 6,912,225 B1 | * | 6/2005 | Kohzuki et al. | 370/412 |
| 6,940,814 B1 | * | 9/2005 | Hoffman | 370/235 |

\* cited by examiner

*Primary Examiner*—Alpus H. Hsu
(74) *Attorney, Agent, or Firm*—Harrity Snyder, LLP

(57) ABSTRACT

A network device includes a group of queues, each having a weighted round robin mechanism. The priority queues on a port detect an overflow condition and transfer a flag to the weighted round robin device in response to detecting the overflow condition. The weighted round robin mechanism adjusts the weight associated with one or more of the priority queues in response to receiving the flag and transfers data from the queues based on the adjusted weights.

18 Claims, 5 Drawing Sheets

SYSTEM AND METHOD FOR DYNAMICALLY UPDATING WEIGHTS OF WEIGHTED ROUND ROBIN IN OUTPUT QUEUES

TECHNICAL FIELD

The present invention relates generally to communication systems and, more particularly, to a system and method for alleviating congestion in a network device.

BACKGROUND ART

Network devices, such as multiport switches, commonly include a group of output ports through which data can be transferred. During high traffic periods, it is common for one or more of these ports to become congested. In a switch that implements output queuing, congestion at an output port is typically indicated by the port's output queue overflowing.

Currently, there is no way to automatically adjust the flow of data out of the network device's output queues to alleviate or avoid an overflow condition.

DISCLOSURE OF THE INVENTION

There exists a need for a mechanism that automatically adjusts the flow of data in a network device to alleviate congestion. This and other needs are met by the present invention, where local hardware, under software control when needed, automatically adjusts the flow of data to a port in a network device when an output queue overflow condition is detected.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a method for transferring data to a port in a network device having a group of priority queues. Each of the priority queues in the network device is associated with a weight. The method includes detecting an overflow condition in one of the priority queues, adjusting the weight associated with at least one of the priority queues in response to detecting the overflow condition, and transferring data from the priority queues based on the adjusted weights.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
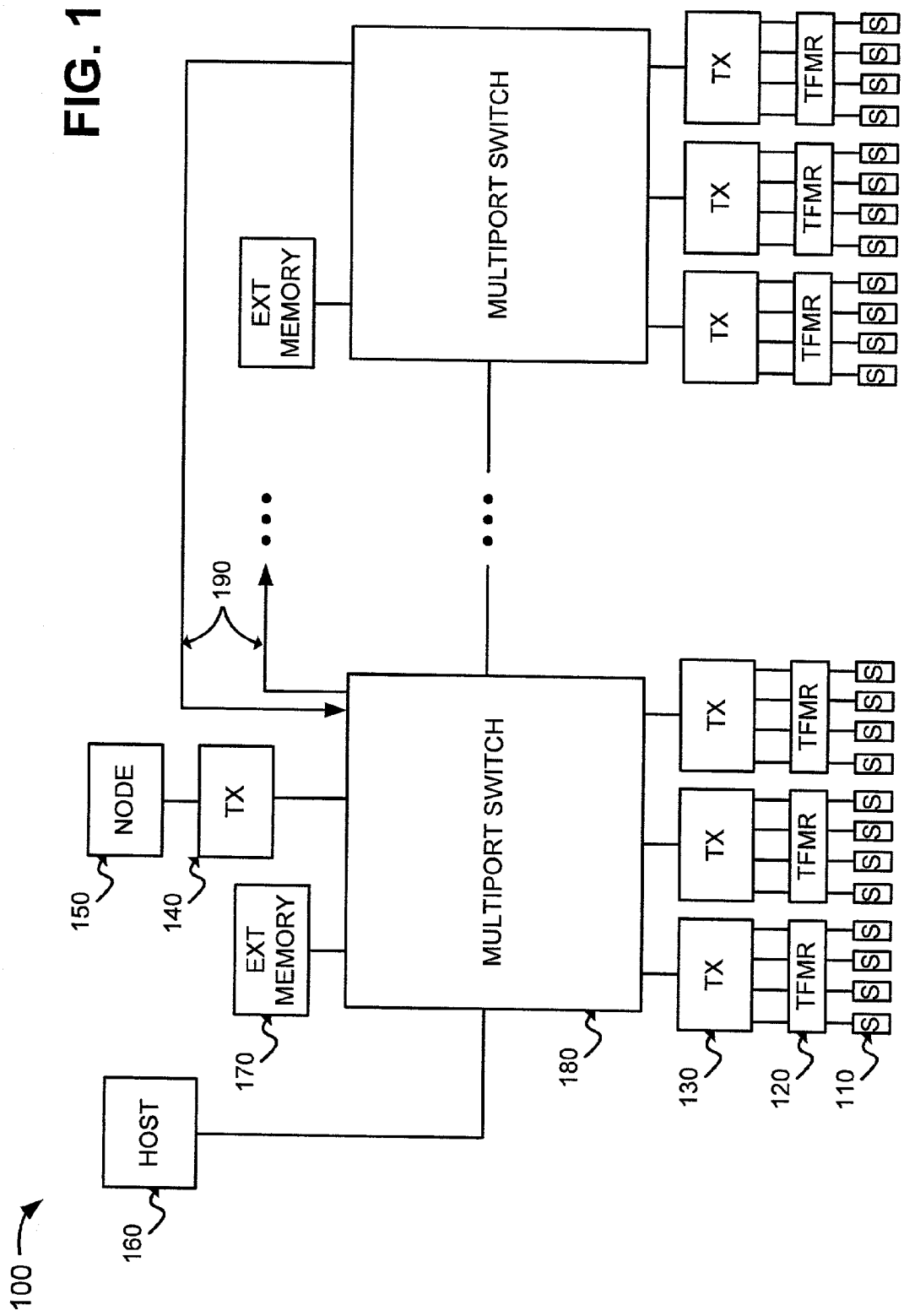
FIG. 1 is a block diagram of an exemplary system in which a system and method consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 10 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128 K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
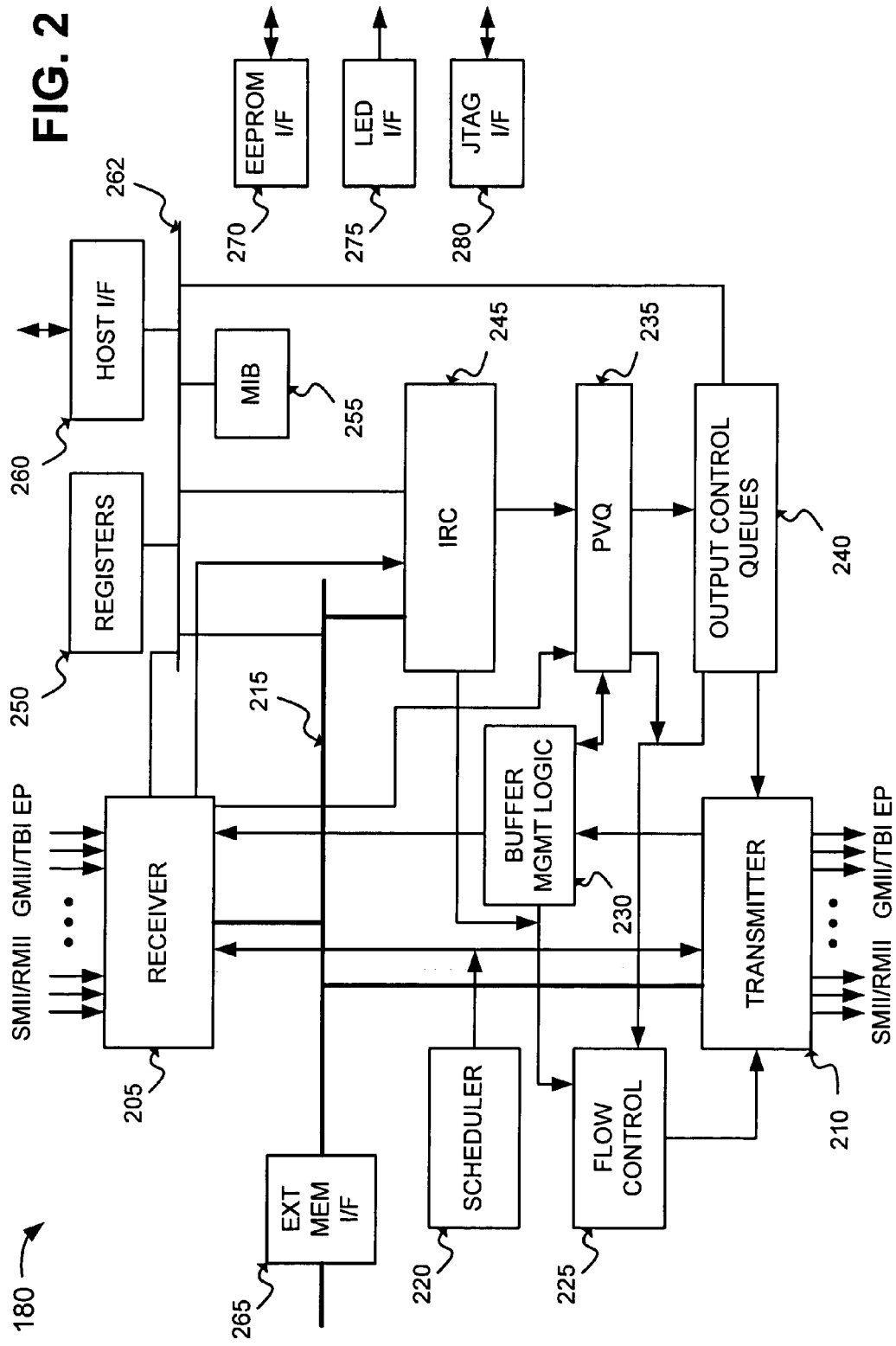
FIG. 2 is a detailed diagram of the multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port.

Therefore, the IRC 245 determines whether a frame temporarily stored in the external memory 170 should be output to a single output port, multiple output ports, no output port, or another multiport switch 180. The IRC 245 may make its forwarding decision based on information stored in an IRC address table.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250. The registers 250, MIB counters 255, host interface 260, receiver 205, data bus 215, output control queues 240, and IRC 245 may be connected via a host bus 262.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

The present invention is directed to improving transmission of data in a network device, such as the multiport switch 180 described above. The multiport switch 180 detects an overflow in an output queue and adjusts the weights of the output queues to support higher priority traffic over lower priority traffic.

Figure 3:
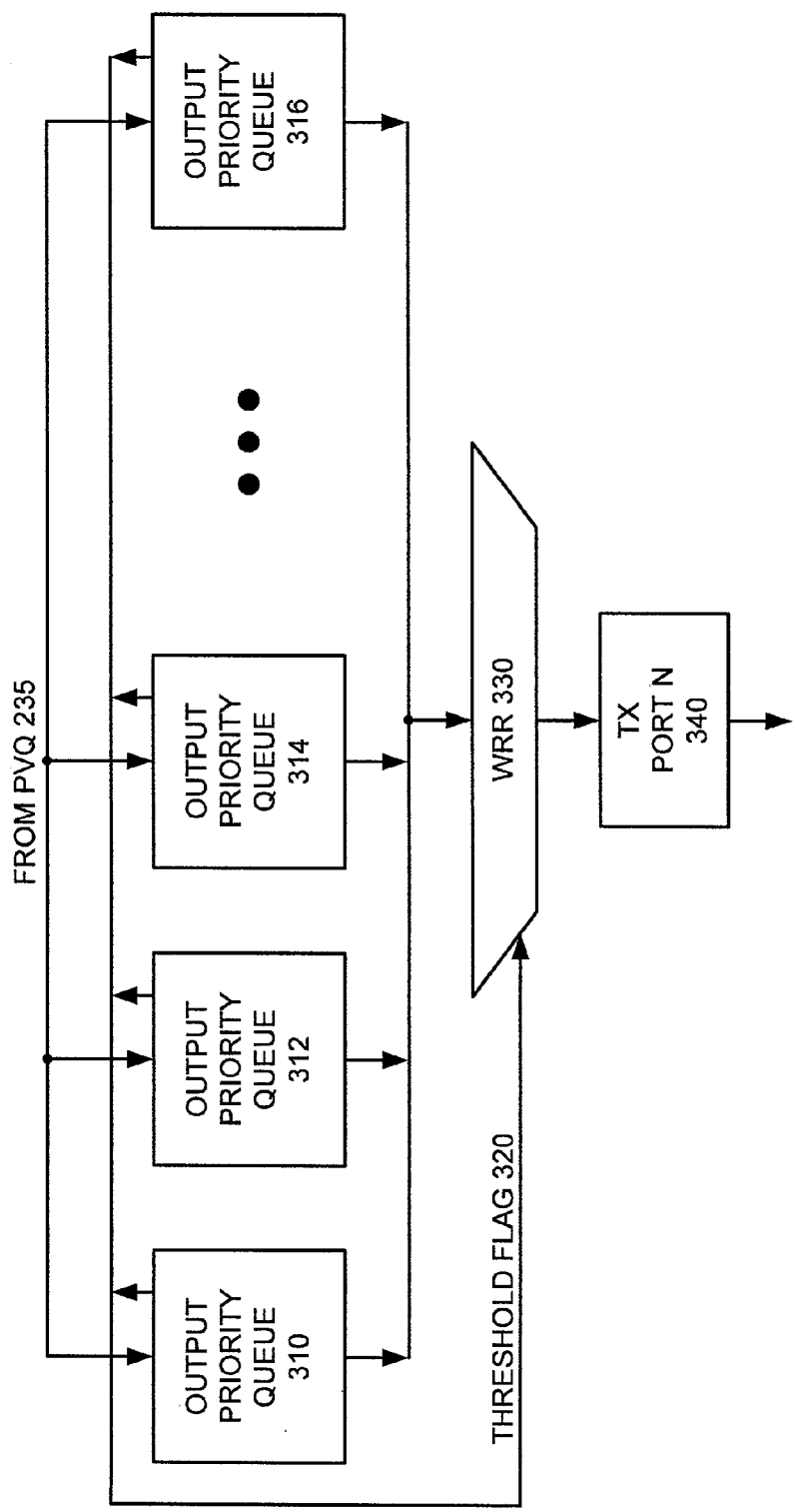
FIG. 3 is an exemplary diagram of a transmitter module and associated output queue for a port N of the multiport switch of FIG. 2.

FIG. 3 is an exemplary diagram of a transmitter module and associated output control queue for a port N of the multiport switch 180 of FIG. 2. The transmitter modules 210 and associated output queues 240 of the other ports of multiport switch 180 may be similarly configured.

In FIG. 3, a group of output priority queues 310–316 connects to a transmitter module (TX) 340 via a weighted round robin (WRR) mechanism 330. The output priority queues 310–316 receive data, such as forwarding descriptors, from the PVQ 235 and provide storage prior to transmission. In an implementation consistent with the present invention, the multiport switch 180 associates multiple output priority queues 310–316 with each transmitter module 340. The output priority queues 310–316 may be associated with different priorities. For example, a first group of the output priority queues 310–316 may store information of a low priority while a second group of output priority queues 310–316 may store information of a high priority. High priority information may include information associated with data that requires lower access latency, such as data destined for a management device or data for a multimedia application. Low priority information may include information associated with any other data.

In an alternative implementation consistent with the present invention, each output priority queue 310–316 may be associated with a different priority. For example, output priority queue 310 may store information having a priority of "1" (i.e., a lowest priority indication), output priority queue 312 may store information having a priority of "2" (i.e., a higher priority indication), output priority queue 314 may store information having a priority of "3" (i.e., a priority indication higher than that associated with output priority queue 312), etc. It will be appreciated that other output queue/transmitter module combinations may alternatively be used.

The WRR mechanism 330 may include one or more devices capable of storing a weight indication for each of the output priority queues 310–316 and allowing one or more entries from an output priority queue 310–316 to be read by the transmitter module 340 based on the stored weights. As will be described in more detail below, the WRR mechanism 330 may receive a threshold flag 320 from an output priority queue 310–316 and adjust the weights of the output priority queues 310–316 so that higher priority traffic to the transmitter module 340 takes preference over lower priority traffic.

The transmitter module 340 may include a MAC module capable of transmitting packets to other network devices, such as network stations 110. The transmitter module 340 may include one or more transmit buffers (not shown), such as FIFO buffers. The transmitter module 340 may also include dequeuing logic (not shown) that reads forwarding descriptors from the output priority queues 310–316 and uses the forwarding descriptors to obtain packets from the external memory 170. The dequeuing logic may also cause the packets to be stored in the transmit FIFOs of the transmitter module 340. The transmitter module 340 may then read the data packets from the corresponding transmit FIFOs and transmit the packets to the network stations 110 or other network devices.

Figure 4:
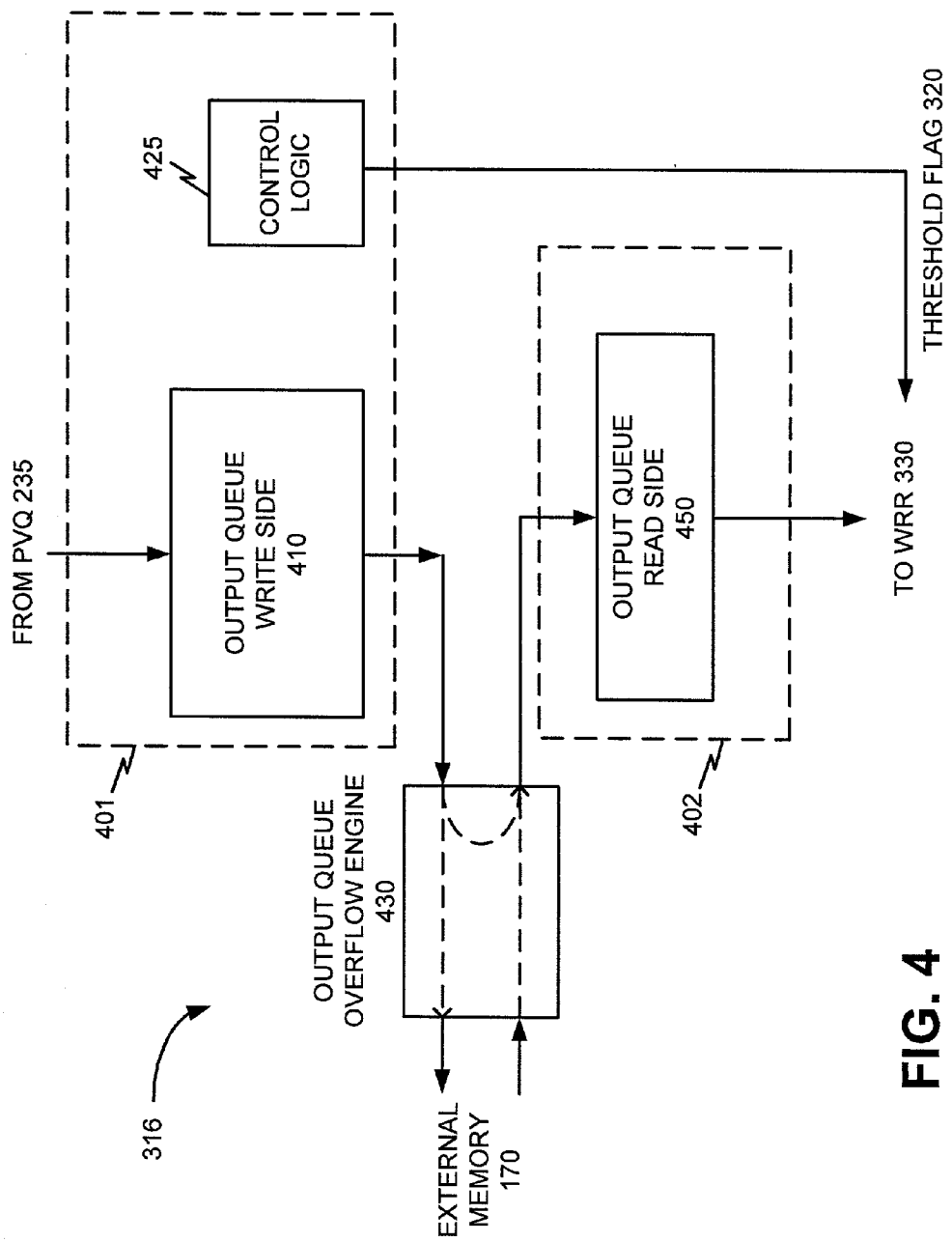
FIG. 4 is a detailed diagram of the output queue of FIG. 3.

FIG. 4 is an exemplary detailed diagram of the output priority queue 316 of FIG. 3. Output priority queues 310–314 may be similarly configured. As illustrated, the output priority queue 316 includes a write side 401, a read side 402, and an overflow engine 430.

The write side 401 of the output priority queue 316 may include a write side queue 410 and control logic 425. The write side 401 receives forwarding descriptors from the PVQ 235 and stores them in the write side queue 410. The control logic 425 may include one or more devices for detecting when the number of entries in the write side 401 exceeds a threshold.

The read side 402 of the output priority queue 316 may include a read side queue 450. The transmitter module's 340 dequeuing logic reads forwarding descriptors from the read side 402 of the output priority queue 316 and uses this information to retrieve packets from the external memory 170. The overflow engine 430 controls writing and reading of data to an overflow area of the external memory 170.

Each of the output priority queues 310–316 may be sized according to the bandwidth of the port it services. There are times, however, when an output priority queue 310–316 cannot hold all the entries destined for the transmitter module 340. When entries are written into an empty output priority queue 310–316, the overflow engine 430 passes the entries directly from the write side 401 to the read side 402 of the queue 310–316. When the read side 402 is full, additional entries written to the output priority queue's 310–316 write side 401 may be placed into the port's output priority queue 310–316 overflow area in external memory 170. Once the port's output priority queue 310–316 read side 402 and overflow area are full, additional entries placed into the output priority queue 310–316 may begin to fill the write side 401 of the queue 310–316. If an attempt is made to write to an output priority queue 310–316 when the write side 401 is full or above a predetermined threshold, the output priority queue 310–316 is considered to be in an overflow state.

In an implementation consistent with the present invention, when an overflow condition exists (i.e., when an output priority queue's 310–316 write side 402 is full or above a predetermined threshold), the output priority queue 310–316, more specifically the control logic 425, transmits a threshold flag 320 to the WRR mechanism 330. As will be described in more detail below, the threshold flag 230 signals the WRR mechanism 330 to adjust the weights associated with the output priority queues 310–316 to give preference to high priority traffic.

Exemplary Processing

Figure 5:
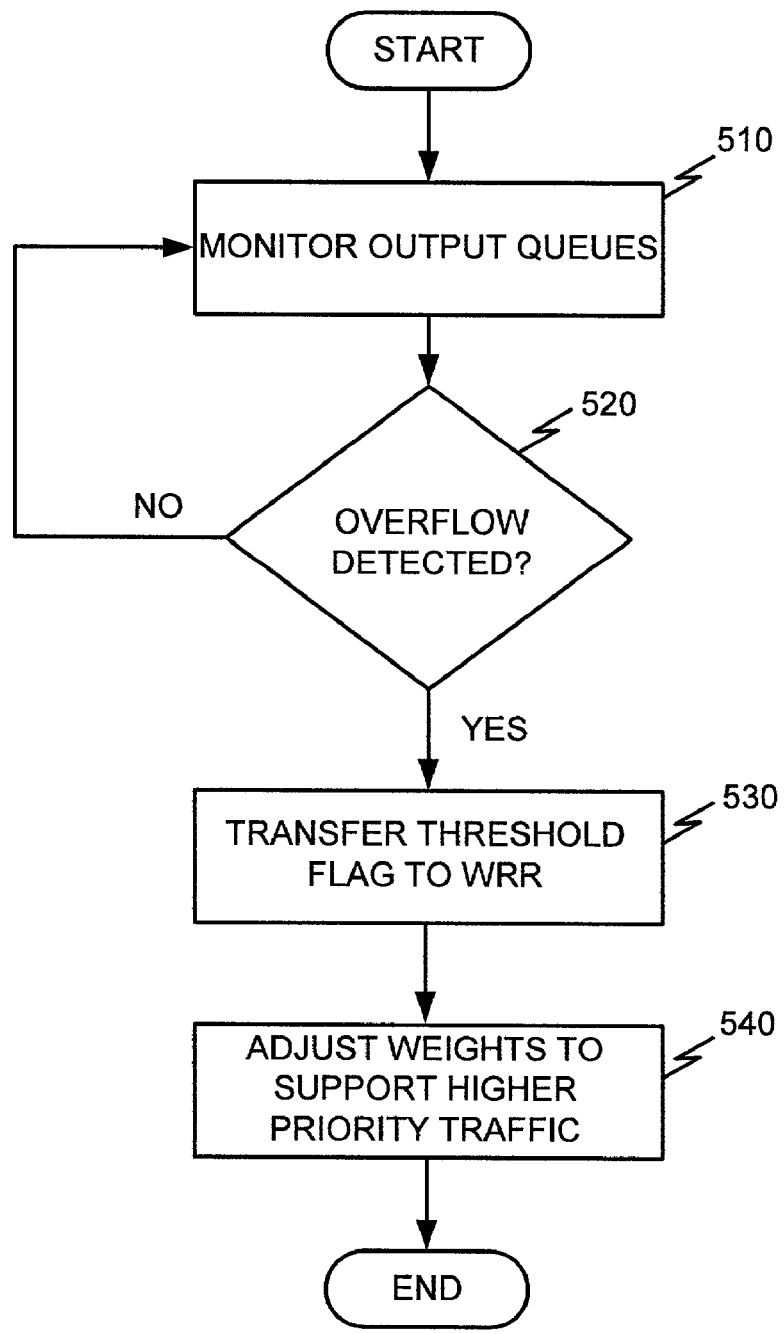
FIG. 5 is a flowchart of exemplary processing for transmitting data according to an implementation consistent with the present invention.

FIG. 5 is a flowchart of exemplary processing for transmitting data according to an implementation consistent with the present invention. Processing may begin with a network device, such as multiport switch 180, monitoring the output priority queues 310–316 to determine whether an overflow condition exists [step 510]. As described above, an overflow condition may exist when the number of entries in the write side 401 of an output queue for a particular priority 310–316 exceeds a predetermined threshold. The threshold may be set automatically or manually by a network administrator.

If the multiport switch 180 detects the occurrence of an overflow condition in an output priority queue 310–316 [step 520], the particular output priority queue 310–316 transfers a threshold flag 320 to the WRR mechanism 330 [step 530]. The WRR mechanism 330 may then adjust the weights associated with the output priority queues 310–316 so that high priority entries are given preference over low priority entries [step 540]. Prior to the adjustment, the WRR mechanism 330 may weight each of the output priority queues 310–316 equally or according to predetermined rules. When the output queues are weighted equally, the WRR mechanism 330 may act according to a conventional round robin scheme. Here, the WRR mechanism 330 may select an entry from each output priority queue 310–316 in turn to be read by the transmitter module 340, skipping queues that do not have entries. Upon receipt of the threshold flag 320, however, the WRR mechanism 330 may adjust the weights of those output queues 310–316 containing high priority entries so that high priority entries take preference over low priority entries. Moreover, according to an implementation consistent with the present invention, the WRR mechanism 330 may attribute the greatest weight to the output queue 310–316 in the overflow state until that time that the overflow condition no longer exists. In such a situation, the threshold flag 320 may include information for identifying the output queue 310–316 from which the flag 320 was transmitted.

As an example, assume that the output priority queues 310–316 are not in an overflow state and that the WRR mechanism 330 assigns an equal weight to each of the output priority queues 310–316. The WRR mechanism 330 may associate, for example, a weight of "1" with each output priority queue 310–316. During normal operation, the WRR mechanism 330 may, in a cyclical fashion, allow for one entry to be read from each output priority queue 310–316, skipping those output priority queues that do not have entries.

Assume now that output priority queue 316 enters an overflow state. Upon entering the overflow state, the output priority queue 316 transfers a threshold flag 320 to the WRR mechanism 330. The WRR mechanism 330 may adjust the weight of the output priority queue 316, as well as those other output priority queues 310–314 having high priority entries. Assuming that output priority queue 314 contains high priority entries while output priority queues 310 and 312 contain only low priority entries, the WRR mechanism 330 may, for example, increase the weights of output priority queue 314 to "3" while increasing the weight of output priority queue 316 (i.e., the output queue in the overflow state) to "6". Here, the WRR mechanism 330 may, in a cyclical fashion, allow, for example, one entry to be read from output priority queues 310 and 312, three entries to be read from output priority queue 314, and six entries to be read from output priority queue 316. By adjusting the flow of traffic to the transmitter module 340 in this manner, the amount of time that an output priority queue 316 remains in overflow state can be reduced. Moreover, by adjusting the overflow threshold to a level below a state in which the queue 310–316 can receive no additional entries, the output priority queues 310–316 can be prevented from entering an overflow state.

Described has been a system and method for adjusting the transfer of data from output queues in a network device based on changes in traffic patterns. Advantages of the present invention include the ability to reduce the amount of time that an output queue is in an overflow state by automatically adjusting the weight assigned to the queue. In addition to this, the number of packets that could possibly be dropped for the higher priority queue are reduced, thus improving end-to-end performance of the network, since typical higher layer protocols transmit all the packets in a certain window size and even if one packet from the window is dropped, the entire window needs to be retransmitted. This scheme would avoid such singular packet drops that cause network performance to degrade.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while the above description focussed on adjusting the amount of data transferred from output queues, the present invention is not so limited. Implementations consistent with the present invention are equally applicable to other types of queues.

What is claimed is:

1. A method for transferring data to a port in a network device having a plurality of priority queues, each priority queue being associated with a weight, comprising:
   detecting an overflow condition in one of the plurality of priority queues;
   adjusting the weight associated with the one of the plurality of priority queues to a value higher than the other of the plurality of priority queues;
   transferring data from the plurality of priority queues based on the adjusted weight; and
   returning the weights of the one of the plurality of priority queues and the priority queues containing high priority data to original values when the overflow condition no longer exists.

2. The method of claim 1 wherein the adjusting comprises:
   changing the weight associated with priority queues containing high priority data.

3. The method of claim 2 wherein the changing the weight comprises:
   increasing the weight associated with the priority queues containing high priority data.

4. The method of claim 1 wherein the network device includes a multiport switch and the plurality of priority queues include one of input queues or output queues.

5. The method of claim 1 further comprising:
   transferring a flag from the one of the plurality of priority queues to a weighted round robin device in response to detecting the overflow condition.

6. The method of claim 5 wherein the flag identifies the one of the plurality of priority queues.

7. The method of claim 1 wherein the weights represent an amount of data to be transferred from each priority queue during a cycle.

8. A network device comprising:
   a plurality of queues, each queue being associated with a weight and being configured to detect an overflow condition and transfer a flag in response to the detecting; and
   a weighted round robin device configured to receive a flag from at least one of the plurality of queues, adjust the weight of the one of the plurality of queues to a value higher than the weights of the other of the plurality of queues, transfer data from the plurality of queues based on the adjusted weight, and return the adjusted weight to an original value when the overflow condition no longer exists.

9. The network device of claim 8 wherein the weighted round robin device is further configured to:
   change the weight of at least one other of the plurality of queues to indicate an increased priority.

10. The network device of claim 8 wherein, when changing the weight of at least one other of the plurality of queues, the weighted round robin device is configured to:
    increase the weight associated with the at least one other of the plurality of queues.

11. The network device of claim 8 wherein the weighted round robin device is further configured to:
    increase the weight associated with each of the plurality of queues containing high priority data.

12. The network device of claim 8 wherein the network device includes a multiport switch and the plurality of queues includes a plurality of output queues.

13. The network device of claim 8 wherein each respective queue is configured to detect the overflow condition when the number of entries in the first output queue of the respective queue exceeds the threshold.

14. A system for transferring data in a network device, comprising:
    a plurality of queues configured to store a number of entries, detect whether the number of entries exceeds a threshold, and transfer a flag when the number of entries exceeds the threshold; and
    a logic device configured to receive a first flag from one of the plurality of queues and cause a higher number of entries to be transferred from the one of the plurality of queues than from the other of the plurality of queues to a port based on the first flag.

15. The system of claim 14 wherein the logic device is further configured to:
    associate a weight with each of the plurality of queues, and
    adjust the weight of at least one of the plurality of queues in response to receiving the flag.

16. The system of claim 15 wherein, when adjusting the weight, the logic device is configured to:
    increase the weight associated with queues containing high priority data, and the system further comprises:
    a transmit module configured to receive the data from the logic device based on the increased weights associated with the queues.

17. The system of claim 14 wherein the logic device is further configured to:
    cause a lower number of entries to be transferred from the one of the plurality of queues when the number of entries stored in the one of the plurality of queues no longer exceeds the threshold.

18. A network device comprising:
    a plurality of queues, each queue being associated with a weight and being configured to detect an overflow condition and transfer a flag in response to the detecting, wherein each of the plurality of queues comprises:
    a write side including a first output queue and control logic configured to detect when a number of entries in the first output queue exceeds a threshold, and
    a read side including a second output queue; and a weighted round robin device configured to receive a flag from at least one of the plurality of queues, adjust the weight of the one of the plurality of queues to a value higher than the weights of the other of the plurality of queues, and transfer data from the plurality of queues based on the adjusted weight.

* * * * *